United States Patent Office 3,836,478
Patented Sept. 17, 1974

1

3,836,478
NEMATIC MATERIALS
Dennis Clinton Green, Peekskill, and William Robert Young, Millwood, N.Y., assignors to International Business Machines Corporation, Armonk, N.Y.
No Drawing. Filed Oct. 24, 1972, Ser. No. 299,991
Int. Cl. C07c 69/76
U.S. Cl. 252—408                                      18 Claims

ABSTRACT OF THE DISCLOSURE

Novel nematic liquid crystals and the method of their preparation are described. These materials have a positive dielectric anisotropy, are operatively nematic over a wide range of temperatures which encompasses room temperature, are colorless, and have desirably high stabilities with respect to air, moisture, electric fields, and visible and ultraviolet light. The novel materials are represented by the following general structural formula

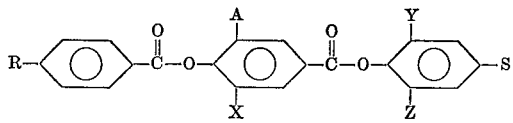

wherein R is a radical selected from the group consisting of alkyl radicals containing from 1 to 12 carbon atoms, alkoxy radicals containing from 1-8 carbon atoms, alkanoyloxy radicals containing from 1-8 carbon atoms, and alkoxycarbonyloxy radicals containing from 1-6 carbon atoms, S is a radical selected from the group consisting of alkyl radicals containing from 1 to 12 carbon atoms and alkoxy radicals containing from 1 to 8 carbon atoms, and A, X, Y and Z are radicals selected from the group consisting of hydrogen and methyl radicals, at least one of the A, X, Y and Z radicals in a compound being methyl radical. The materials can be used singly or in various mixtures to produce desired operating temperatures.

BACKGROUND OF THE INVENTION

This invention relates to liquid crystal materials. More particularly, it relates to novel nematic liquid crystal materials which are operatively nematic in a relatively wide range of temperatures which encompasses room, or close to room temperatures.

In the progressively increasing applications of nematic liquid crystals, particularly in electro-optical devices, a persistent problem which has been encountered has been the inability to provide consistently stable liquid crystals which are nematic in character over a sufficiently wide temperature range wherein such range encompasses normal room temperatures, and which are colorless and stable in the presence of visible light, ultraviolet light, water, oxygen and electric fields.

In considering the uses of liquid crystals, in one of their predominant types of display applications, i.e., the dynamic scattering cell, nematic liquids which have negative dielectric anisotropies are required. To this end, hydrolytically unstable Schiff bases, various azoxybenzene derivatives, and trans-chlorostilbene derivatives, all with room temperature nematic phases, have been employed.

In another and also relatively general type of display device employing nematic materials, operation is dependent upon the electric field alignment of the nematic

2 liquids, i.e., field effect application. In this type of application, operation is not dependent upon current flow (and associated electrochemical reactions), as is the case in dynamic scattering type devices. Consequently, there is presented the possible advantage of extended operating lifetimes for the field effect devices.

These field effect devices are operable with nematic liquids which have a positive dielectric anisotropy. In this connection, three classes of room temperature operative classes of nematic liquids with positive dielectric anisotropy are known, viz., 4,4'-dialkylazoxybenzenes which are of yellow color and have a nematic range at the widest of 22–65° C. for single material and a highest NI (nematic-isotropic) clearing point of 72° C., carbonate esters which are colorless and whose best nematic formulation (tertiary mixture) has a nematic range of 24–76° C., and diphenylacetylenes which are colorless, have a highest NI clearing point of 76° C. and whose best nematic formulation (binary mixture) has a nematic range of 13–64° C.

While these known nematic liquids which have a positive dielectric anisotropy are operative in liquid crystal field effect electro-optical devices, they suffer from the deficiencies in that their nematic operating range is not sufficiently wide, in that some are not colorless, and in that some are not stable in the presence of visible and ultraviolet light, air, water and electric fields.

Accordingly, it is an important object of this invention to provide novel nematic liquid materials which have a positive dielectric anisotropy, are operatively nematic over a wide range of temperatures encompassing room temperatures, such as a range of 25° C. to an excess of 100° C., for example, are colorless, and which have high stability with respect to air, moisture, electric fields, and visible and ultraviolet light.

It is another object to provide nematic liquid materials in accordance with the preceding object which have substantially improved operating lifetimes as compared to known nematic liquid materials.

SUMMARY OF THE INVENTION

Generally speaking and in accordance with the invention, there are provided novel nematic liquid compounds and mixtures of these compounds wherein the compounds have the following general structural formula

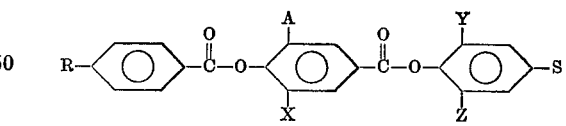

wherein R is a radical selected from the group consisting of alkyl radicals containing from 1 to 12 carbon atoms, alkoxy radicals containing from 1 to 8 carbon atoms, alkanoyloxy radicals containing from 1 to 8 carbon atoms, and alkoxy carbonyloxy radicals containing from 1 to 6 carbon atoms, S is a radical selected from the group consisting of alkyl radicals containing from 1 to 12 carbon atoms and alkoxy radicals containing from 1 to 8 carbon atoms, and A, X, Y and Z are radicals selected from the group consisting of hydrogen and methyl radicals with at least one of the radicals A, X, Y and Z in a compound being the methyl radical.

Also, and in accordance with the invention, there is provided a method for preparing the inventive nematic liquid compounds having the above-set forth general structural formula. This method comprises the steps diagrammatically set forth in the following synthesis

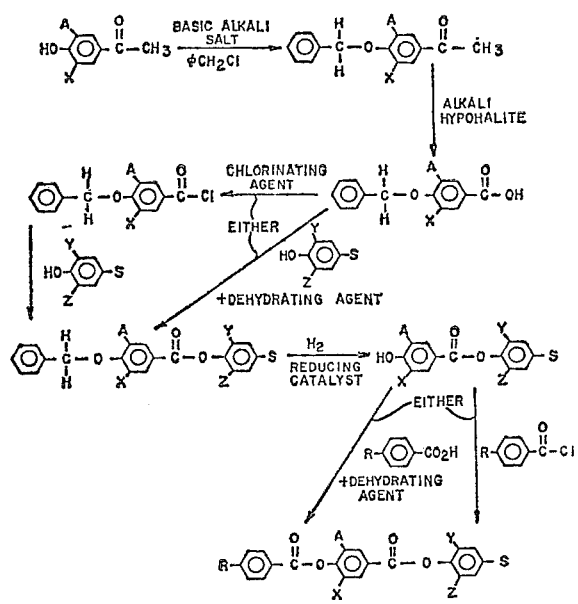

wherein R, S, A, X, Y and Z have their previous significance.

The foregoing and other objects, features and advantages of the invention will be apparent from the more particular description of preferred embodiments of the invention.

DESCRIPTION OF PREFERRED EMBODIMENTS

The novel nematic liquid compounds, i.e., esters, which are provided herein according to the invention have the general structural formula

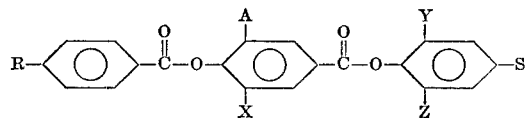

wherein R is a radical selected from the group consisting of alkyl radicals containing from 1 to 12 carbon atoms, alkoxy radicals containing from 1 to 8 carbon atoms, alkanoyloxy radicals containing from 1 to 8 carbon atoms, and alkoxycarbonyloxy radicals containing from 1 to 6 carbon atoms, S is a radical selected from the group consisting of alkyl radicals containing from 1 to 12 carbon atoms and alkoxy radicals containing from 1 to 8 carbon atoms, and A, X, Y and Z are radicals selected from the group consisting of hydrogen and methyl radicals, at least one of the radicals A, X, Y and Z in a compound being the methyl radical.

In one group of esters, the radical R is selected to be an alkoxy radical such as ethoxy, 2-methylpentoxy and hexoxy, an alkanoyloxy radical such as hexanoyloxy and an alkoxycarbonyloxy radical such as butoxycarbonyloxy and an alkyl radical such as butyl and pentyl, and the radical S is selected to be an alkyl radical such as butyl and pentyl, and an alkoxy radical such as ethoxy. The radicals R and S are so selected in analogy with the low melting points and high nematic CMD (cleaning point/melting point difference) for Schiff bases, acetylenes and chlorostilbenes.

In the following table (Table 1a), there are set forth the physical properties of mesomorphic (intermediate between crystalline and isotropic) derivatives of nematic esters according to the invention wherein R is $H_5C_2O$ and S is $C_4H_9$. The esters are numbered 1-8.

TABLE 1a

| Ester No. | A | X | Y | Z | Transition | Temp. (° C.) | ΔH (kcal./mole) | ΔS (e.u.) |
|---|---|---|---|---|---|---|---|---|
| 1 | H | H | $CH_3$ | H | C→N<br>N→I | 113<br>188 | 8.36<br>0.25 | 21.7<br>0.55 |
| 2 | $CH_3$ | H | H | H | C→N<br>N→I | 91<br>179 | 7.32<br>0.39 | 20.1<br>0.87 |
| 3 | H | H | $CH_3$ | $CH_3$ | C→N<br>N→I | 143<br>145 | 8.82<br>0.29 | 21.2<br>0.69 |
| 4 | $CH_3$ | H | $CH_3$ | H | C→I<br>N→I* | 160<br>143 | 10.97<br>0.36 | 25.3<br>0.88 |
| 5 | $CH_3$ | $CH_3$ | H | H | C→N<br>N→I | 122<br>129 | 9.83<br>0.51 | 24.9<br>1.26 |
| 6 | $CH_3$ | H | $CH_3$ | $CH_3$ | C→I<br>N→I* | 195<br>104 | | |
| 7 | $CH_3$ | $CH_3$ | $CH_3$ | H | C→I<br>N→I* | 138<br>103 | 10.41<br>0.50 | 25.9<br>1.32 |
| 8 | $CH_3$ | $CH_3$ | $CH_3$ | $CH_3$ | C→I<br>N→I* | 137<br>79 | | |

In the above table, the * denotes a monotropic transition.

In Table 1b set forth hereinbelow, there are set forth physical properties of a mesomorphic derivative of the above esters wherein R is $H_9C_4$ and S is $OC_2H_5$. The ester is numbered 9.

TABLE 1b

| Ester No. | A | X | Y | Z | Transition | Temp. (° C.) | ΔH (kcal./mole) | ΔS (e.u.) |
|---|---|---|---|---|---|---|---|---|
| 9 | $CH_3$ | H | H | H | C→N<br>N→I | 96<br>176 | 6.28<br>0.40 | 17.0<br>0.90 |

In the above tables, C→N denotes crystalline to nematic and N→I signifies nematic to isotropic.

The esters 1–9 in Tables 1a and 1b hereinabove exhibit intense vibrational absorption in the infrared region at 1735 cm.$^{-1}$ (carbonyl stretching) and at 1505 cm.$^{-1}$ and 1606 cm.$^{-1}$ (phenyl ring vibrations). In addition, at least five intense vibrational bands occur in the C—O stretching region (1000–1300 cm.$^{-1}$) for each ester. In the NMR spectra taken in deuteriochloroform, sharp singlets for the absorption of the methyl group on the central aromatic ring (A and/or X) appear at 2.3 p.p.m. downfield from TMS, while the absorption for methyl groups on the terminal ring appears as a sharp singlet at about 2.2 p.p.m.

Illustrations of where there are no methyl groups in positions A, X, Y, Z, which thereby increase the melting point relative to the monomethyl derivatives 1, 2 and 9 in Tables 1a and 1b, are set forth in Table 1c.

TABLE 1c

| R | S | Transition | Temp. (° C.) | ΔH | ΔS |
|---|---|---|---|---|---|
| $C_4H_9$— | $C_2H_5O$— | C→N<br>N→I | 138<br>225 | 7.63<br>0.30 | 18.6<br>0.61 |
| $C_2H_5O$— | $C_4H_9$— | C→N<br>N→I | 124<br>231 | 9.15<br>0.39 | 23.0<br>0.77 |

The esters are colorless materials and, in comparison with the nematic Schiff bases, azobenzenes, azoxybenzenes, nitrones and stilbenes, are highly transparent in the ultraviolet region. For example, in ethanol solution, ester No. 6 exhibits a $\lambda_{max}$ at 262 nm. (ε extinction coefficient =34,000). Ester No. 6 does not absorb above 340 nm.

The column headed "Temperature" in Tables 1a, 1b and 1c indicates the melting points and clearing points for the respective esters.

With regard to the nematic-isotropic (N→I) transition temperatures, it is to be noted in Table 1a that the nematic-isotropic transition temperatures progressively decrease as the number of aromatic methyl group appendages increase. A possible explanation for such effects is that they result from increased molecular broadening with increased methyl substitution such that intermolecular interactions that are responsible for mesomorphism are decreased as the intermolecular separation increases.

With regard to the positional effects of methyl substitution, it is believed that the nematic-isotropic transition temperature, $T_{NI}$, is lowered by about the same amount when a single methyl group is placed in either of positions A or Y. The placing of two methyl groups on the same ring results in approximately twice the lowering of $T_{NI}$ as compared to the lowering obtained by the addition of a single methyl group. However, when two methyl groups are affixed to different phenyl rings respectively, the lowering of the value of $T_{NI}$ is somewhat less. When the molecule contains three or four methyl groups, the transition temperature drops more slowly with each additional methyl group which is added. This effect probably results from the fact that, with the molecule already broadened by two or more methyl groups, the addition of still more methyl groups has a progressively decreasing effect.

The two rightmost columns in Tables 1a, 1b and 1c contain calorimetric data and pertain to entropies and enthalpies of the nematic-isotropic transition. In the examining of these columns, two facts are readily apparent.

1. Substitution of the central ring by one, and even more so by two methyl groups results in a significant increase in the entropy of the nematic-isotropic phase transition. Central ring substitution affects the heat of transition in the same direction, but a smaller extent.

2. Substitution on the end ring has no comparable effect.

These data are pertinent to the reduction in the transition temperature upon methyl substitution on the central ring. The transition temperature is determined by the heat and the entropy of the transition, the latter being two more fundamental quantities that are representative of the change in the interaction energy and in the order when the transition takes place. This transition is represented by the following equation:

$$T_{NI} = \Delta H_{NI} / \Delta S_{NI}$$

The decrease in the value of $T_{NI}$ upon methyl substitution may be ascribed to a reduction in the energy of intermolecular interactions in the nematic phase, i.e., a lower value for $\Delta H_{NI}$. This result is attributed to either increased intermolecular separation due to lateral substitution or to decreased molecular polarizability resulting from a steric loss of conjugation. While in some instances, the experimentally measured $\Delta H_{NI}$ is smaller for methyl-substituted derivatives than for the parent compound, in accord with previous postulates, this trend cannot be universally true. Methyl substitution in the A and X positions of the esters increases $\Delta H_{NI}$. Consequently, the decrease in transition temperature is due to an increase in $\Delta S_{NI}$.

All of the new compounds exhibit desirable spectral properties and elemental analyses.

To prepare the esters Nos. 1–9, set forth in Tables 1a and 1b, there are utilized the 4-substituted benzoic acids, 4-ethoxybenzoic acid, which is known, and which is made by the Aldrich Chemical Company, and 4-n-butylbenzoic acid. The later acid is prepared by the hydrolysis of 4-n-butylbenzonitrile which is prepared from 4-n-butylaniline available from the aforementional Aldrich Chemical Company by the method as disclosed in the paper of H. T. Clarke and R. R. Read, Org. Syn., Coll. Vol. I, 514 (1941). These acids are refluxed in thionyl chloride to provide 4-ethoxybenzoyl and 4-n-butylbenzoyl chlorides.

Also utilized in the synthesis of the esters Nos. 1–9 in Tables 1a and 1b, are the 4-hydroxybenzoic acids, viz., 4-hydroxybenzoic acid which is known in the art, 4-hydroxy-3-methylbenzoic acid and 4-hydroxy-3,5-dimethylbenzoic acid which are prepared from 4-amino-3-methylbenzoic acid and 4-amino-3,5-dimethylbenzoic acid by diazotization and sulfuric acid hydrolysis, the 4-amino- . . . acids being available from the above-mentioned Aldrich Chemical Company.

Utilizing the above-mentioned 4-substituted-benzoyl chloride and 4-hydroxybenzoic acids produces the 4-(4'-substituted-benzoyloxy)-benzoic acids. These latter acids are prepared by the reaction of the appropriate acid chloride with the appropriate hydroxybenzoic acid under reflux in toluene/pyridine solvent. After removal of the solvents on a rotary evaporator, the residue is dissolved in ether and washed with dilute HCl and water. Evaporation of the ether yields an oily or gummy residue which generally contains the desired product plus some anhydride by-product. The residue is allowed to reflux in aqueous dioxane for a sufficient period (about 4 hours) to hydrolyze any anhydride which is present. The dioxane is removed by azeotropic distillation and the product is isolated by filtration of the hot, aqueous mixture. Recrystallization from a suitable solvent produces the desired white, crystalline products in a 50–80% yield.

The 4-(4'-substituted-benzoyloxy)-benzoic acids are permitted to reflux in an excess of thionyl chloride and the volatile materials are removed therefrom by vacuum distillation to produce 4-(4'-substituted-benzoyloxy)-benzoyl chlorides.

In the synthesis, there are prepared 4-substituted-phenols. Examples of the latter are 4-n-butylphenol which is prepared from 4-n-butylaniline by diazotization and sulfuric acid hydrolysis 4-hydroxy-3-methylbutryophenone and 4-hydroxy-3,5-dimethylbutyrophenone which are prepared by Friedel-Crafts acylation of 2-cresol and 2,6-dimethylphenol, respectively, with butyryl chloride in nitrobenzene with aluminum chloride. The phenols 4-n-butyl-2-methylphenol and 4-n-butyl-2,6-dimethylphenol are prepared from the corresponding butyrophenones set forth hereinabove by the Huang-Minlon modification of the Wolf-Kishner reduction as set forth in the paper of Huang-Minlon, J. Am. Chem. Soc., 68, 2487 (1946). The latter phenols, viz., 4-n-butyl-2-methylphenol and 4-n-butyl-2,6-dimethylphenol are purified by distillation.

The esters set forth in Tables 1a and 1b are prepared by first dissolving an appropriate 4-substituted-phenol in pyridine. An equivalent amount of a 4-(4'-substituted-benzoyloxy)-benzoyl chloride is dissolved in toluene and added to the pyridine solution. After a substantial reflux period, such as an overnight period, the solvents are removed and the residue is taken up in ether. Following washes with water, 10% HCl, 10% NaOH and water, the ether layer is dried and evaporated. The residual product is chromatographed through a column of silica gel with chloroform. The product is then repeatedly crystallized from alcohol or methylcyclohexane and, in some cases, sublimed under high vacuum. The yields of the purified, white products range from 20 to 50%.

There are now set forth hereinbelow, esters included in the general structural formula of which many exhibit melting points below 70° C. and whose mixtures are characterized by nematic phases in temperature ranges of from room temperature to temperatures in excess of 100° C. In these esters, R is a radical selected from the group consisting of alkyl radicals containing from 1 to 12 carbon atoms, alkanoyloxy radicals containing from 1 to 8 carbon atoms, and alkoxycarbonyloxy radicals containing from 1 to 6 carbon atoms, S is an alkyl radical containing from 1 to 12 carbon atoms, A is methyl and X, Y and Z are all hydrogen.

In Table 2, there are set forth examples of these latter nematic esters and their nematic ranges in ° C. In this table, R is methyl to octyl and S is butyl to nonyl.

TABLE 2

| R | S | | | | | |
|---|---|---|---|---|---|---|
|  | BU | PE | HX | HP | OC | NO |
| ME | 89-142 | 82-144 | 88-127 | 91-127 | 87-117 | 73-117 |
| ET | 86-129 | 92-132 | 68-117 | 68-116 | 71-106 | 62-107 |
| PR | 76-138 | 72-141 | 75-127 | 65-125 | 60-116 | 65-115 |
| BU | 72-124 | 54-128 | 79-116 | 52-115 | 62-106 | 53-107 |
| PE | 58-128 | 70-132 | 64-120 | 43-121 | 64-112 | 52-113 |
| HX | 50-117 | 54-122 | 66-110 | 53-112 | 61-105 | 51-105 |
| HP | 67-116 | 48-119 | 62-110 | 56-112 | 70-105 | 56-107 |
| OC | 68-108 | 58-113 | 66-105 | 59-106 | 70-102 | 64-102 |

Other examples of the latter esters are set forth in Table 3 hereinbelow.

TABLE 3

| R | S | Nematic range (° C.) |
|---|---|---|
| 2-methylpentoxy | $C_4H_9-$ | 54-89 |
| $C_6H_{13}O-$ | $C_5H_{11}-$ | 70-152 |
| $C_5H_{11}CO_2-$ | $C_5H_{11}-$ | 61-176 |
| $C_4H_9OCO_2-$ | $C_5H_{11}$ | 77-161 |

A 1:1:1 mixture of the three esters wherein R is phenyl, heptyl and 2-methylpentoxy respectively, and S is butyl, A is methyl and X, Y, Z are hydrogen in all of these esters has a melting point of 27.5° and a nematic clearing point of 111° C. thereby providing a useful nematic range of 83° C.

A 1:1 mixture of the following two esters exhibits a nematic range of 35° to 119° C.

| R | S | A | X, Y, Z |
|---|---|---|---|
| Hexyl | Butyl | Methyl | Hydrogen. |
| Pentyl | Heptyl | do | Do. |

A 1:1:1 mixture of the following three esters is characterized by a nematic range of 20 to 117° C.

| R | S | A | X, Y, Z |
|---|---|---|---|
| Hexyl | Butyl | Methyl | Hydrogen. |
| Pentyl | Heptyl | do | Do. |
| Butyl | do | do | Do. |

There has been set forth hereinabove in connection with the description of the esters 1–9 in Tables 1a and 1b, an efficacious method for their preparation. There is now described hereinbelow, another method for the preparation of the nematic liquids according to the invention which is advantageous in that it is simple, produces high yields of desired final products, and concomitantly produces high yields of the intermediates which result from each step of the process.

The process is first set forth in structural formula diagrammatic form with each step having a designating numeral (n) to permit facile reference to each particular step.

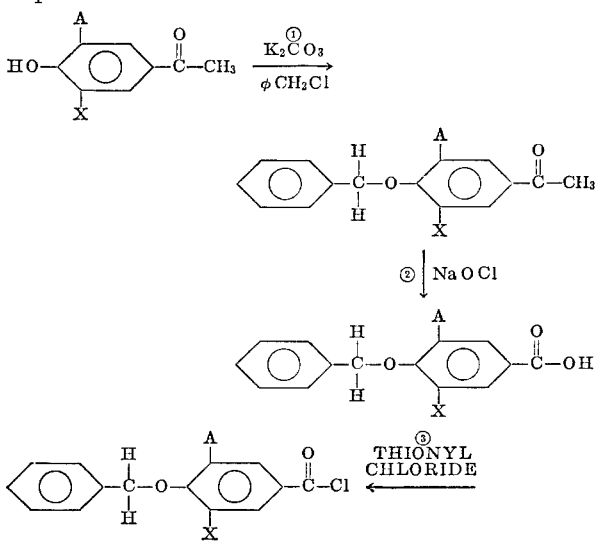

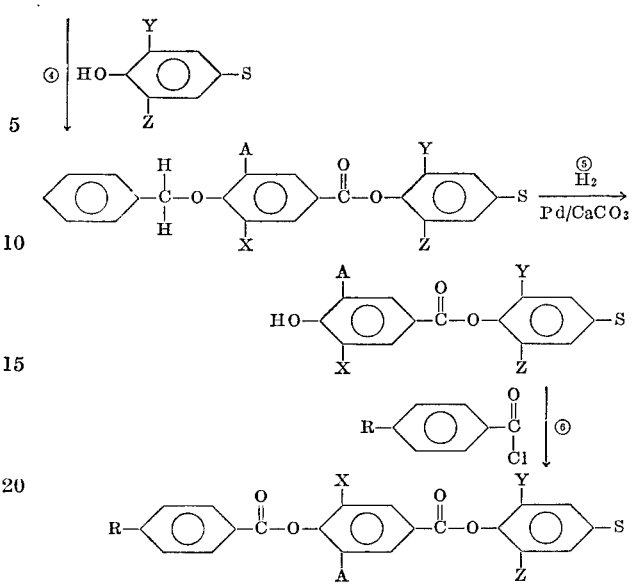

wherein R is a radical selected from the group consisting of alkyl radicals containing from 1 to 12 carbon atoms, alkoxy radicals containing from 1 to 8 carbon atoms, alkanoyloxy radicals containing from 1 to 8 carbon atoms, and alkoxycarbonyloxy radicals containing from 1 to 6 carbon atoms, S is a radical selected from the group consisting of alkyl radicals containing from 1 to 12 carbon atoms and alkoxy radicals containing from 1 to 8 carbon atoms, and A, X, Y, and Z are radicals selected from the group consisting of hydrogen and methyl radicals, at least one of the radicals A, X, Y, and Z in any one ester being the methyl radical.

It is readily apparent that within the ordinary skill of the art, in step (1) as the catalyst, instead of $K_2CO_3$, there can be employed other basic alkali salts such as $Na_2CO_3$, and the like. In step (2), instead of the NaOCl, there could be used other oxidizing agents such as KOBr, NaOBr, NaOCl, i.e., an alkali hypohalite. In step (3), there could be employed instead of the thionyl chloride, other suitable chlorinating agents such as $PCl_5$. Alternatively, step (3) could be skipped and reaction product from step (2) could be directly esterified with a phenol through the use of a dehydrating agent such as dicyclohexylcarbodiimide. In step (5), other reducing agents can be employed such as palladium metal.

To illustrate the superiority of the immediate foregoing method, step (1) provides a yield of about 91%, step (2) provides a yield of about 91%, step (3) provides a yield of about 99%, step (4) provides a yield of about 86%, step (5) provides a yield of about 97%, and step (6) which produces the final product provides a yield of about 79%.

In further considering the advantageous elements of this method, step (1) blocks the OH group thereby precluding the occurrence of undesired side reactions in step (3). In addition, step (2) will not proceed if the OH group is not blocked. The effective blocking agent is the benzyl ($\phi CH_2-$) radical.

There are, at this point, set forth hereinbelow illustrative examples of the methods for providing the nematic esters according to the invention, the method being the one described in connection with the preparation of the esters set forth in Table 1a and 1b, hereinafter referred to as method I and the method diagrammatically outlined in the synthesis shown above, hereinafter referred to as method II.

METHOD I

Example 1

This example illustrates the synthesis of orthomethyl-para-n-butylphenol as utilized in the synthesis of esters 1, 4 and 7 of Table 1a, i.e., wherein Y=CH₃ and Z=H. The pertinent reaction is as follows:

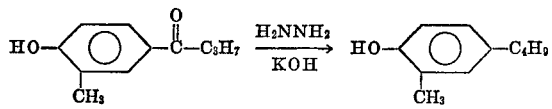

The synthesis is in accordance with the method of Huang-Minlon described in "Org. Reactions," Vol. IV, p. 391, and is as follows.

Quantities of 21 grams (0.118 mole) of the carbonyl compound, 16 ml. of an 85% aqueous solution of hydrazine (0.47 mole) and 22 grams (0.39 mole) of potassium hydroxide were combined in a flask containing 160 ml. of triethylene glycol. The solution was heated to reflux (145° C.) for about one and one-half hours. Then the solution was heated to 195° C., the water was removed in a suitable trap, and the solution was maintained at 195° C. for about four hours at which point it was cooled. At this point, 160 ml. of water was added to the solution and the latter was then slowly dropped into 100 ml. of 6N HCl. An extraction was then performed with diethyl ether and the extract was washed with water. The ether was dried and then was evaporated off. The residue was distilled at 130–132° C./16 mm. to yield 14.8 grams of the desired final product. This was a 77% yield (theoretical yield 19.3 grams=0.118 mole) and had a 99%+ purity. The structure was confirmed by IR and NMR analysis.

Example 2

To provide the phenol to yield esters Nos. 3, 6 and 8 of Table 1a, there was utilized the reactant

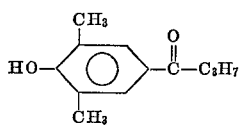

together with the hydrazine and KOH. The reacting quantities were 20 grams, 14.1 ml. of an 85% aqueous solution, and 19.5 grams respectively. The yield was 12.5 grams (67.6%) of the theoretical yield which was 18.5 grams. The method followed was the same as that described in Example 1.

Example 3

To provide the reactant

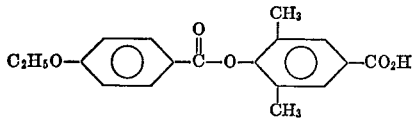

for the synthesis of esters Nos. 5, 7 and 8 of Table 1a, i.e., where both A and X=CH₃, the following synthesis was performed

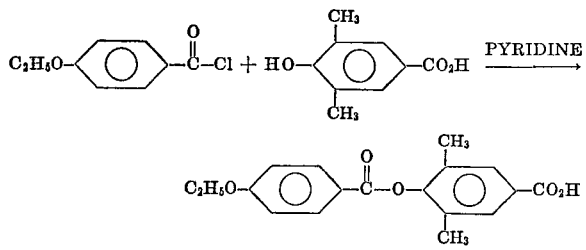

To carry out the above synthesis, there were utilized 3.69 grams (0.02 mole) of the acid chloride and 1.66 grams of the phenol. The phenol was combined with the pyridine and the acid chloride in toluene was added slowly with external cooling. Afther the completion of the latter addition, heating to reflux of the reactants was carried out for about sixteen hours. The solvents were then stripped off under vacuum and the residue was dissolved in diethyl ether. A washing by dilute HCl and water was made and the ether was then stripped off. The resulting oil contained some of the anhydride

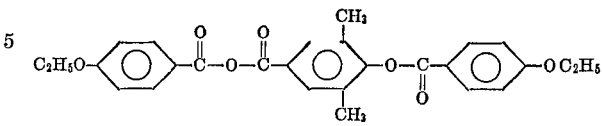

The anhydride was heated to boiling in a mixture of dioxane and water. When all of the dioxane had been azeotroped off and the product had precipitated, the product was isolated by hot filtration. By this synthesis, there was obtained 2.5 grams of final product (79.8% yield, theoretical yield 3.14 grams). The structure was confirmed by IR and NMR analyses.

Example 4

To obtain the reactant

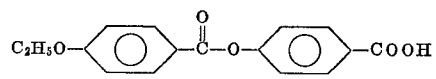

for the synthesis of ester No. 2 in Table 1a, i.e., where A and X are both H, the same procedure was followed as that set forth in Example 3 except that the phenol which was employed was HOφ—COOH. The quantity of reactants used was 10.2 grams of acid chloride, 3.8 grams of phenol. The yield was 3.8 grams of final product (49% of the theoretical yield, 7.9 grams).

Example 5

To obtain the reactant

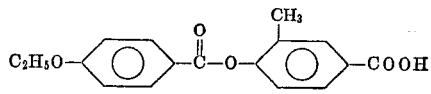

for the synthesis of esters Nos. 2, 4 and 6 of Table 1a, i.e., wherein A=CH₃ and X=H, the same procedure as that of Examples 3 and 4 was employed with the exception that the phenol that was employed was

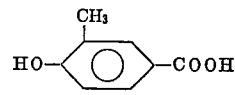

The reactant quantities used were 10.2 grams of acid chloride and 4.2 grams of phenol. The yield was 5.4 grams of final product (65.4% yield, theoretical yield 8.25 grams).

Example 6

Prior to synthesizing the final esters, the alkoxy final products of Examples 3, 4 and 5 had to be converted to the acid chloride. Thus, 0.75 grams of the final product of Example 3 was reacted with 0.85 grams of thionyl chloride. The reaction was carried out by refluxing the combined reactants for about 4 hours. The excess of thionyl chloride was then removed under vacuum. The acid chloride residue was

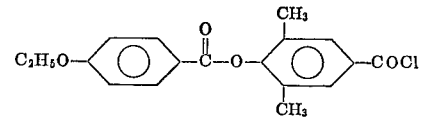

It is appreciated that the final product of Examples 4 and 5 are readily converted to the acid chlorides by reaction therewith with thionyl chloride as described in this example.

Ester Synthesis

To provide the esters of Tables 1a and 1b, there now is merely the reaction of the phenol final products such as described in Examples 1 and 2 with the acid chloride products of Example 6. The method comprises the combining of the phenol and pyridine. This combination is cooled and the acid chloride in toluene is slowly added thereto. The pyridine solution of the reactants is refluxed overnight. Thereafter, the solvents are stripped off, the residue is dissolved in diethyl ether and, then, successive washings are performed with water, 10% HCl, 10% NaOH, and water. The residue is then dried and chromatographed through a column of silica gel using chloroform. The ester is recrystallized from methyl-cyclohexane.

Example 7

Performing the ester synthesis utilizing 1.4 grams of the acid chloride of the final product of Example 5 and 0.77 grams of the final product of Example 1, there is produced in about 70% yield the ester No. 4 of Table 1a.

Example 8

Performing the ester synthesis utilizing 0.62 gram of the acid chloride of the final product of Example 4 and 0.34 gram of the final product of Example 1, there is produced in 67% yield the ester No. 1 of Table 1a.

Example 9

Performing the ester synthesis utilizing 0.62 gram of the acid chloride of the final product of Example 4 and the final product of Example 2, there is produced ester No. 3 of Table 1a.

It can be seen from the above example that using suitable quantities of reactants and following the procedures set forth for providing the appropriate phenols and acid chlorides, there are produced the esters having the formula

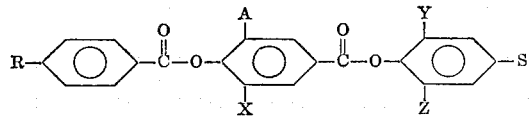

wherein R and S are alkyl and alkoxy radicals.

METHOD II

Example 10

This example sets forth step (1) of the method II synthesis, i.e., the reaction

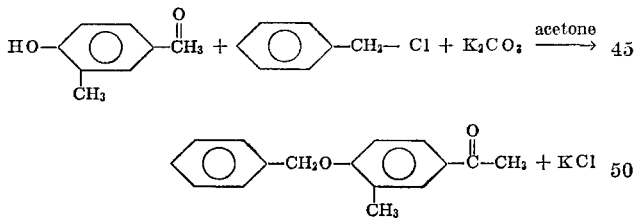

In carrying out this step, 15 grams (0.1 mole) of the phenol, 126 grams (1 mole) of the chloride and 27.6 grams (0.2 mole) of the $K_2CO_3$ were combined in the acetone and refluxed for about 48 hours. Thereafter, the refluxed mixture was cooled to room temperature and the KCl was filtered off. Hexane was then added to the residue which was thereafter cooled to −20° C. The ketone final product was then filtered off and recrystallized from methylcyclohexane. The yield was about 91%. The final ketone product had a melting point of 76–77° C.

Example 11

This example sets forth step (2) of the method II synthesis, i.e., the reaction

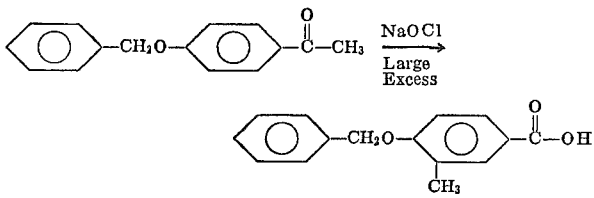

In carrying out this step, 8.5 grams of the ketone (final product of Example 10) was combined with 600 ml. of NaOCl (6% free chlorine) in a sufficiently large Erlenmeyer flask and the combination was heated at 80° C. for a period sufficiently long to cause all of the ketone to go into solution. The combination was then cooled to 25° C. and the free chlorine was thereafter removed by adding bisulfite until a negative test was obtained with acidified KI-Starch paper. The residue was then acidified with HCl and the final acid product was filtered off and recrystallized from methylcyclohexane. The yield was about 91%. The acid product had a melting point of 183° C.

Example 12

This example sets forth step (3) of the method II synthesis, i.e., the reaction

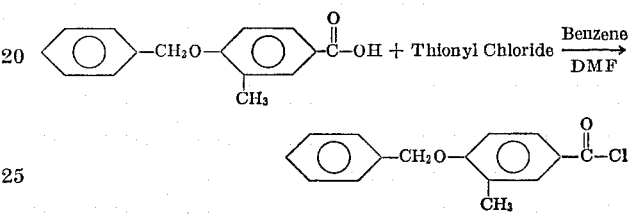

In carrying out this step, 39.2 grams of the acid (final product of step 2, Example 11) and 40 ml. of thionyl chloride were combined in the benzene. To this product, there were added about 10 drops of N,N-DMF (dimethylformamide). The mixture was then refluxed for about one-half hour (until no more HCl boiled off). Thereafter, the solvent and excess thionyl chloride was stripped off and the residue was dissolved in 500 ml. of hot hexane. The hexane solution was cooled to room temperature and the product was filtered under $N_2$ pressure. The yield was about 99%. The acid chloride final product had a melting point of about 67° C.

Example 13

This example illustrates step (4) of the method II synthesis, i.e., the following reaction

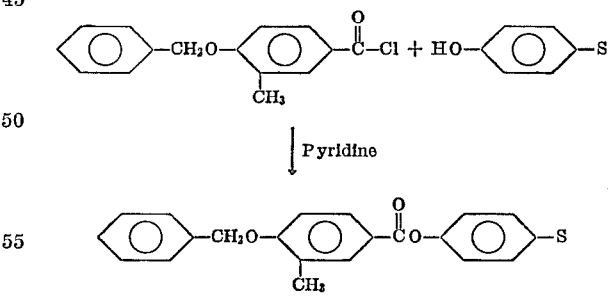

As has been mentioned hereinabove, S can be an alkyl radical of from 1 to 12 carbon atoms. In this example, S is chosen to be the n-butyl radical but the principles of the example obtain where any of the other alkyl radicals are used.

In carrying out this step, 30 grams of the acid chloride and 17.2 grams of the p-n-butylphenol were combined in pyridine, the combination was refluxed for about three hours, and then cooled to room temperature. The cooled combination was then poured into cold water. The product was filtered off and recrystallized from 80% ethanol and then from methylcyclohexane. The final product had a melting point of 69.5–71° C. The yield was about 86%.

Example 14

This example illustrates step (5) of the method II synthesis, i.e., the following reaction. In this reaction, there is utilized the final product of Example 13, i.e., where S=n-butyl

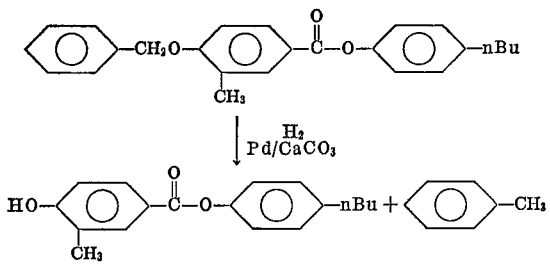

In carrying out this step, 30 grams of the benzyl ether (final product of Example 13) was dissolved in dioxane with 5% of 80% aqueous ethanol. To the solution, there was added the catalyst, i.e., about 0.1 gram of Pd/CaCO$_3$ and the solution was shaken in a Parr apparatus overnight under hydrogen pressure of about 60 lbs. The completion of the hydrogenation was ascertained by thin layer chromatography. The catalyst was filtered off, the solvents were evaporated and the final product was recrystallized from methylcyclohexane. The yield was about 97%. The final product had a melting point of about 147–148° C.

Example 15

This example illustrates step (6) of the method II synthesis, i.e., the following reaction

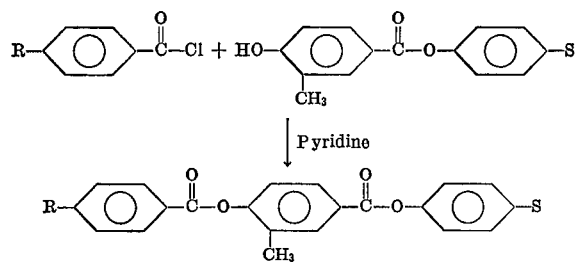

It has been mentioned that S in the above phenol can be an alkyl group of from 1 to 12 carbon atoms. Similarly, the R in the phenol can also be an alkyl group of from 1 to 12 carbon atoms. This example illustrates the case where both R and S are n-butyl. However, the method of this example can be used with any combination of these alkyl groups.

To carry out this step, 0.73 grams of the acid chloride and 1.05 grams of the phenol were combined in pyridine and the combination was refluxed for about 4 hours. The refluxed mixture was then poured into cold water. The product was extracted with diethyl ether. The extracted product was washed with 10% HCl and water, dried and the ether was removed. The product was then recrystallized from 95% ethanol and then from hexane. The yield was about 79%. The final product had a melting point of about 71.6° C.

Example 16

The same procedure was followed as in Example 15 except that in the acid chloride which was utilized, R=C$_6$H$_{13}$O and in the phenol which was utilized, S=n-pentyl. The reacting quantities were 0.805 grams of acid chloride and 1 gram of phenol. The final product had a melting point of 68–69° C.

Example 17

The same procedure was followed as in Example 16 except that in the acid chloride R=C$_5$H$_{11}$CO$_2$. The reacting quantities were 0.85 grams of acid chloride and 1.0 gram of phenol. The final product had a melting point of 62–63° C.

Example 18

The same procedure was followed as in Examples 16 and 17 except that in the acid chloride R=C$_4$H$_9$OCO$_2$. The reacting quantities were 0.86 gram of acid chloride and 1.0 gram of phenol. In addition, the final product was further purified by column chromatography. It had a melting point of about 77° C.

In the diagram of the synthesis set forth hereinabove, wherein the use of a dehydrating agent is indicated, a suitable example of such agent is dicyclohexylcarbodiimide.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A nematic liquid compound having the following general structure formula

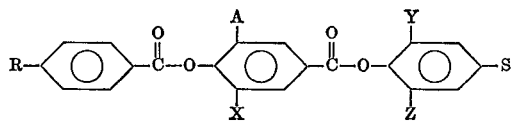

wherein R is a radical selected from the group consisting of alkyly radicals containing from 1 to 12 carbon atoms, alkoxy radicals containing from 1 to 8 carbon atoms, alkanoyloxy radicals containing from 1 to 8 carbon atoms, and alkoxycarbonyloxy radicals containing from 1 to 6 carbon atoms, S is a radical selected from the group consisting of alkyl radicals containing from 1 to 12 carbon atoms and alkoxy radicals containing from 1 to 8 carbon atoms, and A, X, Y and Z are radicals selected from the group consisting of hydrogen and methyl radicals, at least one of the radicals, A, X, Y and Z in a compound being the methyl radical.

2. A nematic liquid compound as defined in claim 1 wherein R is the butyl radical and S is the ethoxy radical.

3. A nematic liquid compound as defined in claim 1 wherein R is the ethoxy radical and S is the butyl radical.

4. Nematic liquid compound having the following general structural formula

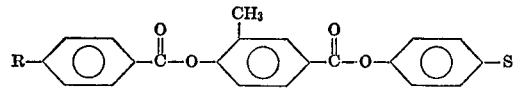

wherein R is a radical selected from the group consisting of alkyl radicals containing from 1 to 12 carbon atoms, alkoxy radicals containing from 3 to 8 carbon atoms, alkanoyloxy radicals containing from 1 to 8 carbon atoms, and alkoxycarbonyloxy radicals containing from 1 to 6 carbon atoms, and S is a radical selected from the group consisting of alkyl radicals having 1 to 12 carbon atoms and alkoxy radicals having 3 to 8 carbon atoms.

5. A nematic liquid compound as defined in claim 4 wherein R is the 2-methylpentoxy radical and S is the butyl radical.

6. A nematic liquid compound as defined in claim 4 wherein R is the C$_5$H$_{11}$CO$_2$ radical and S is the pentyl radical.

7. A nematic liquid compound as defined in claim 4 wherein R is the C$_4$H$_9$CO$_2$ radical and S is the pentyl radical.

8. A nematic liquid compound as defined in claim 4 wherein R is the butyl radical and S is the pentyl radical.

9. A nematic liquid compound as defined in claim 4 wherein R is the heptyl radical and S is the pentyl radical.

10. A nematic liquid compound having the general structural formula:

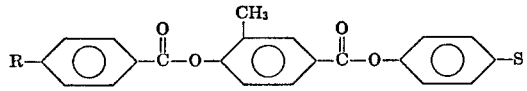

wherein R and S are selected from the group consisting of alkyl radicals having 1 to 12 carbon atoms.

11. A nematic liquid compound as defined in claim 10 wherein R is the pentyl radical and S is the heptyl radical.

12. A nematic liquid compound as defined in claim 10 wherein R is the hexyl radical and S is the butyl radical.

13. A nematic liquid compound as defined in claim 10 wherein R is the hexyl radical and S is the nonyl radical.

14. A nematic liquid compound as defined in claim 10 wherein R is the butyl radical and S is the heptyl radical.

15. A nematic liquid compound as defined in claim 10 wherein R is the pentyl radical and S is the nonyl radical.

16. A mixture of nematic liquid compounds comprising in 1:1:1 ratio by weight:

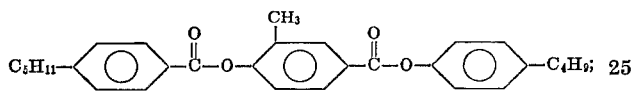

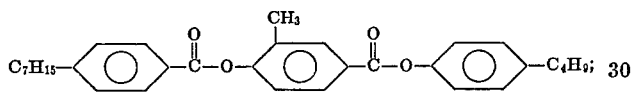

and

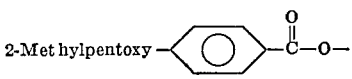

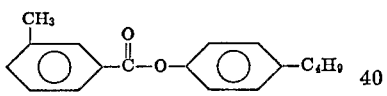

17. A mixture of nematic liquid compounds comprising in 1:1 ratio by weight:

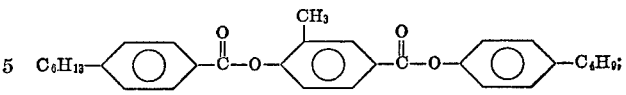

and

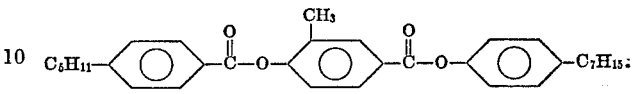

18. A mixture of nematic liquid compounds comprising in 1:1:1 ratio by weight:

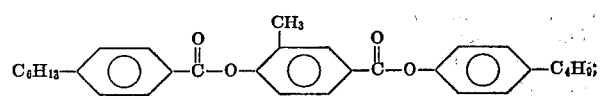

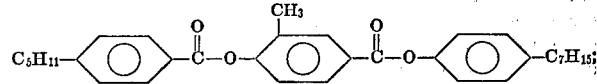

and

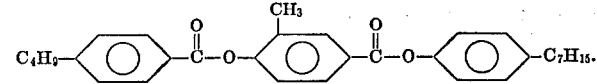

References Cited

UNITED STATES PATENTS 3,674,338  7/1972  Cartmell et al. ------ 350—117

FOREIGN PATENTS 2,009,528  9/1971  Germany ---------- 260—473 R

RALPH S. KENDALL, Primary Examiner

U.S. Cl. X.R.

260—473 R; 350—160 LC

UNITED STATES PATENT OFFICE
CERTIFICATE OF CORRECTION

PATENT NO. : 3,836,478
DATED : September 17, 1974
INVENTOR(S) : D. C. Green et al.

It is certified that error appears in the above-identified patent and that said Letters Patent are hereby corrected as shown below:

Column 7, line 21, delete "phenyl" and substitute therefor --pentyl--.

Signed and sealed this 10th day of June 1975.

(SEAL)
Attest:

RUTH C. MASON
Attesting Officer

C. MARSHALL DANN
Commissioner of Patents
and Trademarks